Dec. 5, 1967   J. J. BRAGULAT   3,356,907
PANELBOARD STRUCTURE WITH ADJUSTABLE SHIELD
Filed June 28, 1965   2 Sheets-Sheet 1

WITNESSES:
John L. Chopp
James F. Young

INVENTOR
James J. Bragulat
BY
William A. Elchik
ATTORNEY

United States Patent Office 3,356,907
Patented Dec. 5, 1967

3,356,907
PANELBOARD STRUCTURE WITH ADJUSTABLE
SHIELD
James J. Bragulat, Newtown, Conn., assignor to Westinghouse Electric Corporation, Pittsburgh, Pa., a corporation of Pennsylvania
Filed June 28, 1965, Ser. No. 467,246
2 Claims. (Cl. 317—120)

ABSTRACT OF THE DISCLOSURE

A panelboard structure comprising adjusting means for providing a sealing engagement between enclosed circuit interrupters and a shield at a flush-type installation.

This invention relates generally to panelboard structures and more particularly to panelboards or load centers that are constructed for wall-type installation.

At wall-type installations of panelboards or load centers, an opening is generally provided in a wall to receive the receptacle part of the panelboard so that the outer cover structure of the panelboard will be flush with the outer wall surface. After the completion of the finish plastering, the receptacle part of the panelboard that is disposed in the wall opening is sometimes tilted relative to the outer planar plastered wall surface. When the cover structure is moved into the mounted position, the trim part of the cover structure engages the outer wall surface, and the shield part that is below the openable door of the cover structure should engage the front surfaces of the circuit breakers to seal off the internal part of the receptacle. In order to compensate for misalignment and to permit the trim structure to engage the outer wall surface while the internal shield part engages the outer surfaces of the circuit interrupters, it has been common in the past to resiliently mount the circuit interrupters within the receptacle part of the load center and to spring bias the circuit interrupters out toward the cover structure into engagement with the shield. This general type of mounting construction is known as a flush mounted construction as opposed to a surface mounted construction wherein a different type of cover structure is attached to a receptacle part without the need for special alignment at an installation. Since the automatic resilient aligning feature is not necessary for many surface mounted constructions wherein a different cover structure is used, and because it is desirable from the economic standpoint to standardize the receptacle part of a panelboard structure, it is desirable to provide the aligning feature on the cover structure rather than on the receptacle part of the panelboard. Thus, the receptacle part can be used in both a flush mounted construction and a surface mounted construction with only the cover structures being interchanged to fit the installation requirements.

Accordingly, an object of this invention is to provide a panelboard structure with improved means providing adjustment of the cover structure thereof at flush-mounted installations.

Another object of this invention is to provide a panelboard structure with an improved flush-type cover structure comprising automatic aligning means.

A more general object of this invention is to provide an improved panelboard structure that is relatively easy to assemble and install.

The features that are considered characteristic of the invention are set forth in particular in the appended claims. The invention itself, however, both as to structure and operation, together with additional objects and advantages thereof, will be best understood from the following detailed description when read in conjunction with the accompanying drawings.

Figure 1:
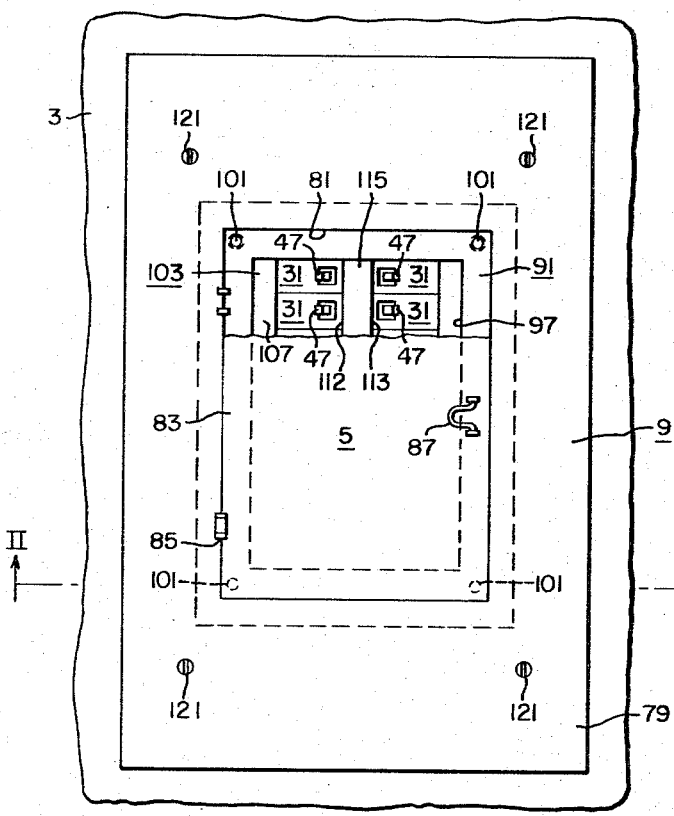
FIGURE 1 is a plan view, with parts broken away, of a flush-mounted panelboard structure constructed in accordance with principles of this invention.
Figure 2:
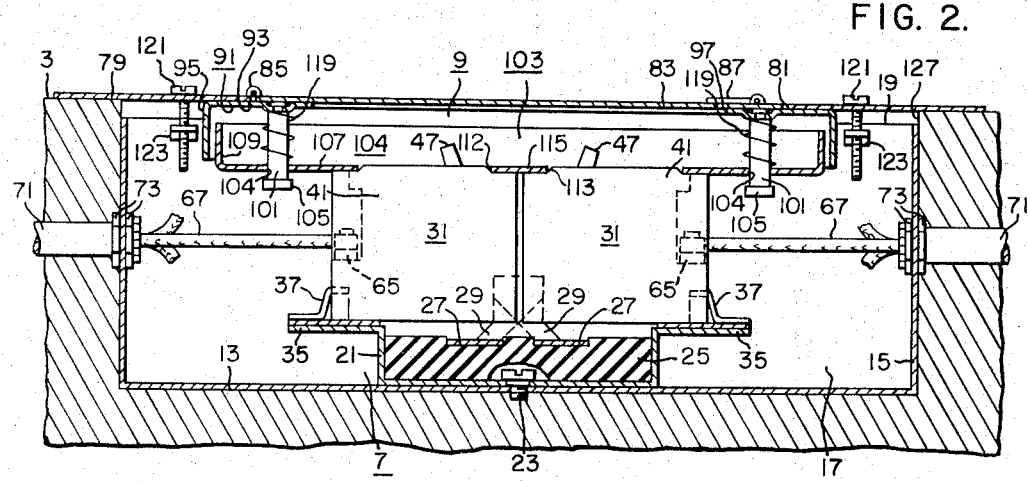
FIG. 2 is a sectional view, on an enlarged scale relative to FIG. 1, taken generally along the line II—II of FIG. 1.

Referring to FIGS. 1 and 2, there is shown therein part of a wall 3 of a building and a panelboard or load center structure 5 supported on the wall 3. The panelboard 5 comprises a receptacle 7 and a cover structure 9.

The receptacle 7 comprises a sheet metal structure comprising a generally planar base 13. Two end walls 15 and two side walls 17 (only one of the side walls being seen in FIG. 2) extend up from the base 13, normal to the base, to form an opening at the front of the receptacle 7. As can be seen in FIG. 2, the side wall means 15, 17 terminate at an end part 19 that surrounds the opening formed at the front of the receptacle 7.

A sheet-metal pan member 21 (FIG. 2) is fixedly secured to the base 13 of the receptacle 7 by securing means such as screws 23. An insulating support block 25 is supported on the pan 21, and conducting bus bars 27 are supported on the insulating block 25. A plurality of rigid stab-type conducting connectors 29 extend from each of the bus bars 27 to enable electrical connection between the bus bars 27 and clip-on type terminal structures of circuit breakers 31. The pan member 21 is provided with oppositely disposed shelf parts 35, and a plurality of clip structures 37 are fixedly mounted on each of the shelf parts 35. As can be seen in FIG. 1, a plurality of the circuit breakers 31 are mounted in the receptacle 7. Each of the circuit breakers 31 is supported at the load end thereof on the associated shelf 35 of the pan member 21 with the associated clip 37 disposed in a notch in the circuit breaker housing to secure the load end of the circuit breaker in place. Each of the circuit breakers 31 is supported at the line end thereof on the associated stab connector 29 that engages between oppositely disposed clip members of a conducting clip-on type terminal structure of the circuit breaker to support the line end of the circuit breaker and to electrically connect the circuit breaker with the associated bus bar 27. Each of the circuit breakers 31 is a molded-case type circuit breaker since it comprises an insulating housing 41 for housing the circuit-breaker mechanism. Each of the circuit breakers 31 is a circuit breaker of the type disclosed in the patent to F. L. Gelzheiser, Pat. No. 3,110,786, issued Nov. 12, 1963. Because the circuit breaker is more specifically described in the aforementioned Gelzheiser patent, only a schematic drawing (FIG. 6) and brief description thereof will be provided in this case.

Figure 6:
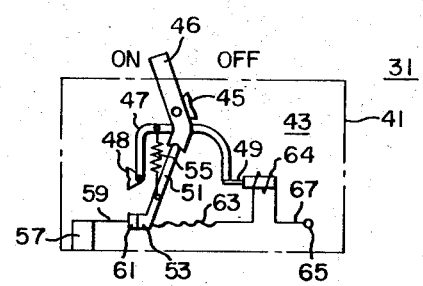
FIG. 6 is a schematic view of one of the circuit breakers shown in FIGS. 1 and 2.

Referring to FIG. 6, the circuit breaker 31 comprises an insulating housing indicated by dash-dot lines at 41, and a circuit-breaker mechanism 43 supported within the housing 41. The circuit-breaker mechanism 43 comprises an opearting member 45 having a handle part 47 that extends out through an opening in the front of the housing 41. A releasable trip member 45 is pivotally supported at one end thereof on a fixed pivot 47. A latch-and-trip device 49 latches the other end of the trip member 45. A contact arm 51, having a movable contact 53 secured at one end thereof, is pivotally supported at the other end on the operating lever 45. An overcenter tension spring 55 is supported at one end thereof on the contact arm 51 and at the other end on the releasable trip member 45. The circuit through the breaker 31 extends from a clip-on type terminal structure 57, through a conductor 59, a stationary contact 61, the movable contact 53, the conducting contact arm 51, a flexible conductor 63, a trip coil 64, to a terminal 65. The latch-and-trip structure 49 can comprise a combination thermal-and-magnetic trip device that is energized to effect thermal and magnetic tripping operations upon the occurrence of overload currents in a manner well known in the art and more specifically described in the aforementioned Gelzheiser patent. The contacts 53, 61 are opened by pivotal movement of the handle 47 from the "on" to the "off" position to move the contact arm 51 and spring 55 to effect an overcenter spring opening operation of the contact arm 51 in a manner well known in the art. The contacts are closed by reverse movement of the handle 47 to the "on" position to move the contact arm 51 and spring 55 to effect an overcenter operation of the spring 55 to close the contacts in a manner well known in the art. Upon the occurrence of a tripping overload current, the latch-and-trip means 49 releases the trip member 45 whereupon the trip member 45 is pivoted about the pivot 47 by the force of the spring 55 to effect a change of the relative positions of the parts of the circuit breaker mechanism whereupon the spring 55 operates to effect an opening operation of the contact arm 51 in a well known manner. The terminal structure 65 is provided for connecting the breaker to a load conductor 67 in a manner well known in the art.

As can be seen in FIGS. 1 and 2, two rows of circuit breakers 31 are supported in the receptacle 7 on the supporting pan 21 with the circuit breakers of the opposite rows being in a close end-to-end relationship. A separate load conductor 67 is connected to the load end of each of the circuit breakers 31 by means of a solderless terminal connecting structure 65 in a manner well known in the art. Two enclosing metal conduits 71 are disposed in suitable openings in the wall 3 and they are secured to the end walls 15 of the receptacle 7, at openings in the end walls 15, by means of securing means 73. The securing means 73, in each case, comprises two threaded members that are threaded together and onto the metal conduit 71 at opposite sides of the associated end wall 15 of the receptacle. The load lines 67 are extended out from the receptacle 7 through the conduits 71.

The cover structure 9 comprises a sheet-metal generally planar trim member 79 having a rectangular opening 81 formed in the center part thereof. A planar sheet-metal cover or door 83 is pivotally supported on the trim member 79 by means of hinges 85. A handle member 87 is pivotally supported on the door member 83. A sheet-metal flange member 91, comprising a horizontal (FIG. 2) support part 93 and a vertical (FIG. 9) flange part 95, is welded or otherwise fixedly secured to the underside of the trim member 79. The flange member 91 surrounds the opening 81. The flange member 91 is provided with a generally rectangular opening 97 therein that comprises four sides that are generally parallel to the sides of the opening 81 in the trim member. As can be seen in FIG. 1, the rectangular opening 97 in the flange member 91 is of reduced dimensions relative to the rectangular opening 81 in the trim member 79. Four rigid metallic posts are fixedly secured to the horizontal part 93 of the flange member 91 at four corners of an imaginary rectangle. As can be seen in FIG. 2, the posts 101 pass through suitable openings in the flange member 91 and they are riveted over at the upper side of the member 91 whereby they are rigidly secured to the member 91. A sheet-metal flanged shield member 103 is movably connected to the flange member 91 on the posts 101. The shield member 103 is provided with four openings 104 therein in alignment with the four posts 101, and the posts 101 fit loosely in the openings. Each of the posts 101 is provided with a lower shoulder portion 105 thereon to prevent movement of the shield member 103 off of the post 101. The shield member 103 is a sheet-metal shield member comprising a generally planar horizontal (FIG. 2) shield part 107 and a vertical (FIG. 2) flange part 109 extending upward from the shield part 107 completely around the perimeter of the part 107 to form a tray-shaped or receptacle-shaped shield structure. Opening means comprising two generally rectangular openings 112 and 113 are provided in the part 107 of the shield member 103. As can be seen in FIG. 2, a center part 115 that is formed integral with the shield part 107 separates the openings 112, 113 of the shield member 107. A separate helical compression spring member 119 is disposed over each of the four posts 101 between the members 91 and 103. The spring members 119 bias the shield member 103 toward the shoulder parts 105 of the posts 101. Thus, the shield 103 is supported on the trim structure or door structure 79, 91, 83 for movement relative to the trim or door structure.

The cover structure 9 is secured to the receptacle 7 by means of four screws that are disposed at four corners of an imaginary rectangle. Each of the screws 121 passes through a suitable opening in the trim member 79 and it is threaded into a tap opening in a suitable bracket 123 that is welded or otherwise fixedly secured to the side wall means of the receptacle 7.

Figure 3:
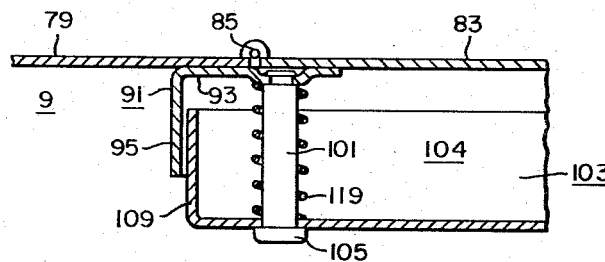
FIG. 3 is a sectional view of certain parts of the cover structure seen in FIGS. 1 and 2.

As can be seen in FIG. 2, an opening 127 is provided in the wall 3 to receive the receptacle 7. The receptacle 7 is placed into the opening 127 and suitable securing means such as nails or screws are used to secure the receptacle to the wall 3 in a manner well known in the art. The receptacle 7 is disclosed as being tilted relative to the wall surface 3 in that the end wall on the left (FIG. 2) is disposed lower into the wall opening 127 than the end wall on the right as seen in FIG. 2. A reason for this tilting is that the finished plastering at many installations may not provide an even wall surface. The novel cover structure of this invention provides for engagement of the trim member 79 against the outer wall surface 3, to provide a flush-type installation in the wall, and also for engagement of the shield member 103 with the front-portions of the insulating housings 41 of the circuit breakers 31 to thereby seal off the internal part of the receptacle even though the receptacle 7 is tilted, relative to the wall surface, in the wall opening. The cover structure 9 is moved into the position shown in FIG. 2 wherein the shield part 107, 115 of the shield member 103 engages the front parts of the housings 41 of the circuit breakers 31. After the initial engagement of the shield part 107, 115 with the front parts of the insulating housings 41 of the circuit breakers 31, the cover structure 9 is moved further into the mounted position until the trim member 79 engages the outer wall surface 3 during which movement the shield member 107 moves up (FIG. 2) on the posts 101 against the bias of the compression springs 119. This relative movement of the shield member 103 on the posts 101 relative to the trim 79 and door 83 permits the sealing engagement between the shield parts 107, 115 and the circuit interrupter housings 41 and also the flush-type engagement between the trim 79 and the outer wall surface 3. This is an automatic alignment or adjusting feature. When the cover structure 9 is in position, the four screws 121 are passed through suitable openings in the cover structure and threaded into tapped openings in the four brackets 123 that are attached to the side walls of the receptacle 7 to thereby draw the cover structure into the mounted position which movement is limited by the engagement of the trim member 79 with the outer wall surface 3. With the cover structure 9 in the fully mounted position shown in FIGS. 1 and 2, the door 83 can be opened exposing a pocket 124 that is formed between the door 83, the support 91, the shield 103 and circuit breakers 31. The circuit breaker handles 47 protrude into the pocket 124 through the openings 112, 113 in the shield member where they are accessible for manual operation of the circuit breakers. The flange part 109 of the shield 103 overlaps with the flange part 95 of the flange support member 91 to provide an overlapping arrangement between these members with the overlap forming the encompassing side walls of the pocket 124 to thereby provide a seal between the pocket 124 and the inner part of the receptacle that is disposed below the shield member 107. If desired, the overlap could be reversed with the flange 109 being on the outside of the flange 95 rather than on the inside as shown in FIGS. 2 and 3. If desired, suitable additional sealing or insulating means could be provided between the members 103 and 91 to provide a more effective sealing arrangement.

Figure 4:
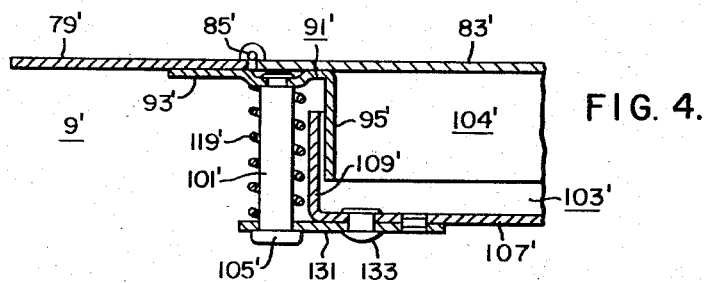
FIG. 4 is a view similar to FIG. 3 illustrating another embodiment of the invention.

Another embodiment of the invention is disclosed in FIG. 4. The parts of the structure disclosed in FIG. 4 that are similar to the parts in FIG. 3 are identified in FIG. 4 by primed reference characters that are numerically the same as the reference characters that are used to designate the similar parts in FIG. 3. In the structure disclosed in FIG. 4, the shield member 103' is supported on the posts 101' by means of four sheet-metal members 131 that are fixedly secured to the shield part 107' of the shield 103' by means of rivets 133. There is a separate support 131 for each of the four posts 101'. Each of the supports 131 is provided with a suitable opening therein that loosely receives the associated post 101' permitting the support 131 to move axially on the post 101'. The overlap 95', 109' of the members 91', 103' extends completely around the perimeter of the pocket 104'. It is noted, however, that the overlap in FIG. 4 is disposed on the inside of the four posts 101', whereas the overlap of the embodiment of FIG. 3 is disposed on the outside of the posts 101. In both cases, the relative positioning of the two flange parts of the overlap is reversible in that either one of the flange parts can be disposed on the inner side of the pocket relative to the other of the flange parts. The structure of FIG. 4 is embodied in the overall combination in the same manner as that hereinbefore described with reference to the structure disclosed in FIGS. 1-3.

Figure 5:
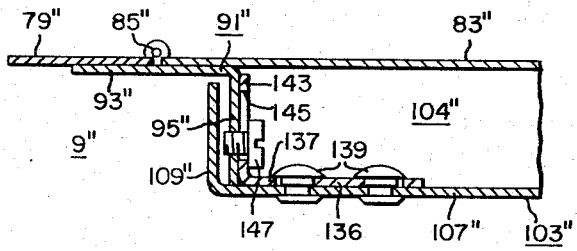
FIG. 5 is a view similar to FIG. 3 illustrating another embodiment of the invention.

Another embodiment of the invention is disclosed in FIG. 5. The parts of the structure disclosed in FIG. 5 that are similar to the parts in FIG. 3 are identified in FIG. 5 by double primed reference characters that are numerically the same as the reference characters that are used to designate the similar parts in FIG. 3. Referring to FIG. 5, the shield member 103'' is secured to a generally horizontal leg 136 of a metal sheet-metal bracket 137 by means of two rivets 139. In addition to the horizontal (FIG. 5) leg 136, the bracket member 137 comprises a vertical leg 143 having an elongated slot 145 therein. The slot 145 is elongated in a vertical (FIG. 5) direction. An adjusting screw member 147 passes through the slot 145 and it is threaded into a tapped opening in the flange or side wall 95'' of the support 91''. There are four similar brackets 137 used in the structure illustrated in FIG. 5 at the four corners of the shield 103'' to support the shield 103'' on the support 91'' which support 91'' is secured to the trim member 79''. Vertical adjustment is made by means of the adjustment at the four supporting brackets 137. When it is desired to adjust the relative position, at a particular bracket, between the shield 103'' and support 91'', the associated screw is worked to a non-binding position and the shield member 103'' is thereafter moved in a vertical (FIG. 5) direction on the support 91'' to the adjusted position. Thereafter, the screw 147 is tightened to support the associated bracket 137 on the support 91'' to thereby support the associated corner portion of the shield on the support 91''. The four corners of the shield are all supported in the same manner as that herein specifically described. With the exception that the shield 103'' is manually adjustable to a fixed adjusted position on the support 91'', the embodiment of FIG. 5 cooperates in the overall combination in the same manner as that hereinbefore described with reference to FIGS. 1-3.

From the foregoing, it can be understood that there is provided by this invention an improved panelboard or load center with improved adjusting or aligning means for providing a sealing engagement between the shield and the enclosed circuit breakers at a flush-like installation. This improved adjustment or aligning feature is provided by means of an improved unitary cover structure comprising a shield member that is supported for movement on the trim of the cover structure. In two embodiments of the invention, the shield is supported on posts secured to the trim by suitable support means and the shield is biased away from the trim, to a limited position, by means of coil springs that are disposed on the posts to thereby provide an automatic adjustment or alignment of parts when the cover structure is moved to the installed position. In another embodiment of the invention, the shield is supported for movement on the trim, and manually operable means is provided for manually setting and securing the shield in a sealing position after the cover structure has been moved to the installed position. In all of the specifically described embodiments, overlapping means are provided between the shield member and support in order to provide an effective serial arrangement to seal off the covered pocket, that is disposed between the door and shield from the internal part of the receptacle. With the cover structure in the mounted position, the circuit breakers cannot be removed and a worker does not have access to live parts of the panelboard structure. As was hereinbefore set forth, with the provision of the improved cover structure of this invention, the same receptacle structure can be standardized or used to accommodate either a surface-mounted or flush-mounted combination. The cover structure of this invention is used at flush-mounted installations.

While the invention has been described specifically in accordance with the provisions of the patent statutes; it is to be understood that various changes and modifications in the structural details and arrangement of parts may be made without departing from some of the central features of the invention.

I claim as my invention:

1. A panelboard structure comprising an enclosure, said enclosure comprising a receptacle structure and a cover structure, circuit-interrupting means mounted in said receptacle structure, said circuit-interrupting means comprising a plurality of circuit breakers, each of said circuit breakers comprising an insulating housing a pair of contacts within the housing and an operating handle extending from the front of the housing which handle is manually operable to open and close the contacts, said receptacle structure having a receptacle-opening, said cover structure comprising a trim structure, a door supported on said trim structure for pivotal movement to open and closed positions, a plurality of supporting posts supported on the inner side of said trim structure, a shield member supported on said supporting posts opposite said door for movement toward and away from said trim structure and door, spring means on said posts biasing said shield member away from said door, means drawing said cover structure toward said receptacle to move said trim structure to a fixed mounted position, said spring means biasing said shield member into engagement with the insulating housings of a plurality of said circuit breakers, said shield member having opening means therein receiving said handles to permit manual operation of said circuit breakers, said cover structure and said circuit breakers forming a pocket under said door separate from the main internal part of said receptacle structure, said trim structure and said shield member comprising overlapping parts forming overlapping wall means around the perimeter of said pocket, and said shield member preventing removal of said circuit breakers from said receptacle structure whereby live parts of said panelboard structure are inaccessible when said cover structure is in said fixed mounted position.

2. A panelboard structure according to claim 1, said plurality of supporting posts comprising at least four posts supported on the inner side of said trim structure in a spaced relationship, and said spring means comprising a separate spring on each of said four posts.

References Cited

UNITED STATES PATENTS

| 1,856,288 | 5/1932 | Ogle | 317—119 |
| 2,036,044 | 3/1936 | Hammer | 317—119 |
| 2,372,083 | 3/1945 | Johansson et al. | 317—120 |
| 2,630,477 | 3/1953 | Rypinski | 317—119 |
| 2,758,257 | 8/1956 | Wills | 317—119 |

ROBERT S. MACON, *Primary Examiner.*

ROBERT K. SCHAEFER, *Examiner.*

H. O. JONES, *Assistant Examiner.*